128,875

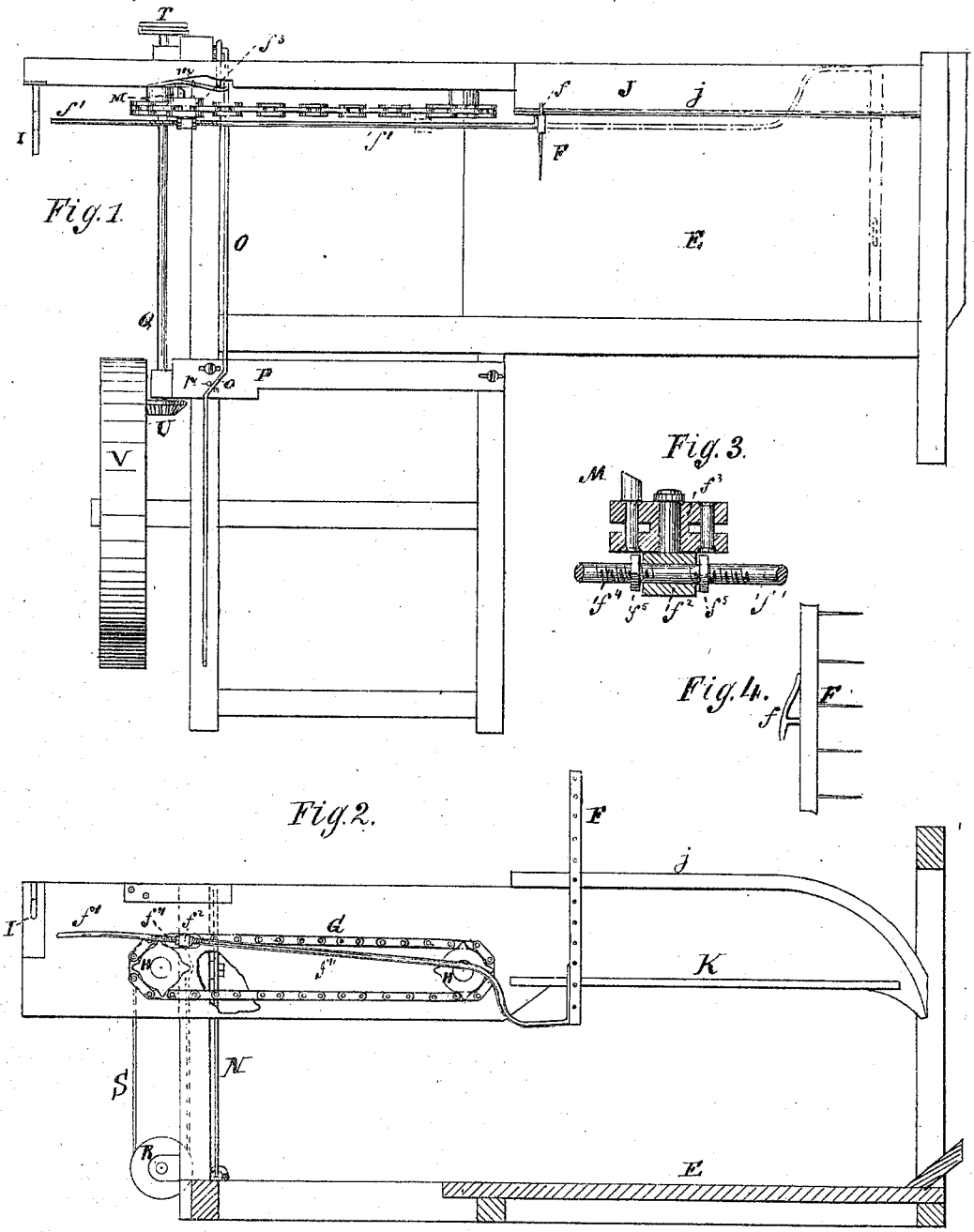

UNITED STATES PATENT OFFICE.

GEORGE S. GRIER, OF MILFORD, DELAWARE.

IMPROVEMENT IN HARVESTER-RAKES.

Specification forming part of Letters Patent No. 128,875, dated July 9, 1872.

Specification describing Improvements in Harvesters, invented by GEORGE S. GRIER, of Milford, in the county of Kent and State of Delaware.

The invention will first be fully described, and then clearly pointed in the claim.

Figure 1 is a top view, Fig. 2 is a front view of the rake, and Figs. 3 and 4 are detail views.

E is the harvester-platform, on which the grain falls, and $e$ an inclined and projecting guard thereon for the purpose of preventing the waste of grain. F is the rake, which intermittently gathers the grain in gavels and sweeps it off from the platform. This has the handle attached near an end which is beveled underneath. The rake has a hook, $f$, on its back and a handle, $f^1$, which is swiveled at some distance from the end in a block, $f^2$, that is itself swiveled to a carrier-link, $f^3$, in the endless chain G. The handle $f^1$ is also threaded at $f^4$ and provided with two nuts, $f^5 f^5$, by which the throw of the rake may be changed. The chain G is arranged upon two sprocket-wheels, H H, one of which is rotated by a pulley or suitable mechanism connected with the wheels of the harvester. I is a notched plate projecting out in rear of the endless chain, while J is a curved plate in front thereof, provided with an upward flange, $j$. K is a bar thereunder.

The mode of operation is as follows: The movement of the chain draws the rake back and over the platform to sweep off a gavel in the usual manner; but when this has been accomplished, and it is desired to carry it back, the free end of handle enters the notch of plate I. As the chain now moves on upward the swiveled block $f^1$ goes with it, turning upon its pivot, which also serves as a fulcrum for the lever-handle. The handle being held at a fixed point of elevation while the block continues to rise, the rake is lifted. In ascending, one end of the rake strikes the bar K, by which it is turned a quarter-revolution or edgewise. This has the effect to throw the hook $f$ above the level of plate J. The end of handle is now supported until this hook embraces flange $j$, when the handle leaves the notched plate I. The rake is now guided edgewise along to the front of the grain-platform until it drops on the front thereof. Its beveled end and gravity cause it to turn over with its teeth on the platform. M is a stud on endless chain that presses a spring-plate, $m$, against which rests the end of a lever, N. This lever is jointed to long hand-shaft O, which has the incline $o$. P is a slotted plate, in which is journaled the shaft Q, and which is provided with the studs $p\ p$, between which the incline $o$ of rod O rests and moves. On one end of this shaft Q is the pulley R, which moves, by means of an intermediate belt, S, the pulley T that drives the rake belt. On the other end of this shaft is a bevel-pinion, U, which gears with a drive-wheel, V. By this construction of parts the rake-carrier is thrown out of gear with the power-mechanism automatically, while it is thrown in gear by hand by long rod O.

Having thus described my invention, what I claim as new, and desire to secure by Letters Patent, is—

1. The combination of swiveled rake-handle $f^1$ with block $f^2$, swiveled in a carrier-link, $f^3$, attached to the endless chain, as and for the purpose described.

2. A harvester-rake, having swiveled handle, beveled end, and hook on back, in combination with notched plate I, flanged-plate J, and bar K, as and for the purpose set forth.

3. The combination of endless rake-carrier, having stud M, with spring-plate $m$, lever N, hand-shaft O, and movable pulley-shaft Q, having pinion rotated from drive-wheel R, as and for the purpose described.

GEORGE S. GRIER.

Witnesses:
JOHN W. RATCLIFF,
J. YOUNGER GRIER.